United States Patent [19]

Buckley et al.

[11] Patent Number: 4,976,406

[45] Date of Patent: Dec. 11, 1990

[54] UTILITY STAND

[75] Inventors: Clifford J. Buckley; Steven R. Pfister, both of Fort Collins, Colo.

[73] Assignee: BPP Corporation, Fort Collins, Colo.

[21] Appl. No.: 430,819

[22] Filed: Oct. 10, 1989

[51] Int. Cl.⁵ .............................................. B62B 3/02
[52] U.S. Cl. .................................... 280/641; 248/98; 280/47.26
[58] Field of Search ...................... 248/98, 97, 95, 100, 248/101, 129, 145.6, 907; 280/641, 651, 39; 141/391, 314, 379; 220/404

[56] References Cited

U.S. PATENT DOCUMENTS

| | | | |
|---|---|---|---|
| 2,787,310 | 4/1957 | Zerbe | 248/97 X |
| 3,633,932 | 1/1972 | Holden | 248/98 X |
| 3,655,157 | 4/1972 | Dalton | 248/101 X |
| 4,180,113 | 12/1979 | Liebling | 248/98 X |
| 4,248,443 | 2/1981 | Ohlson | 280/39 |
| 4,549,748 | 10/1985 | Haley, Sr. | 280/641 |
| 4,593,873 | 6/1986 | Nelson | 248/98 |
| 4,705,247 | 11/1987 | Delmerico | 248/98 |
| 4,765,644 | 8/1988 | Bell | 280/641 |

Primary Examiner—Ramon O. Ramirez
Attorney, Agent, or Firm—Dean P. Edmundson

[57] ABSTRACT

A portable, self-supporting, collapsible utility stand is described for supporting a trash bag or the like in an upright manner with its top open to receive the deposit of trash or other material therein. The stand includes two U-shaped frame sections which are connected together in a manner such that they will pivot with respect to each other between open and closed positions. Wheels are connected to the lower end of one of the frame sections. The upper end of the other frame section includes a handle to facilitate movement of the stand when needed. A bag is supported within the area defined by the frame sections, and the upper end of the bag is supported in an open condition by the frame sections. A pivotable cover/chute member is supported by one of the frame sections and can be pivoted between open and closed positions.

18 Claims, 5 Drawing Sheets

FIG. 5
FIG. 6
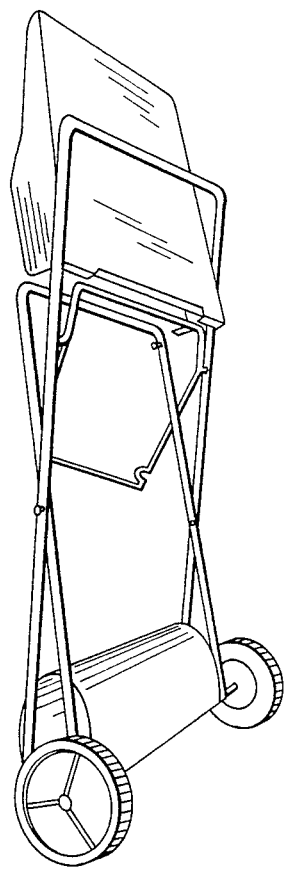
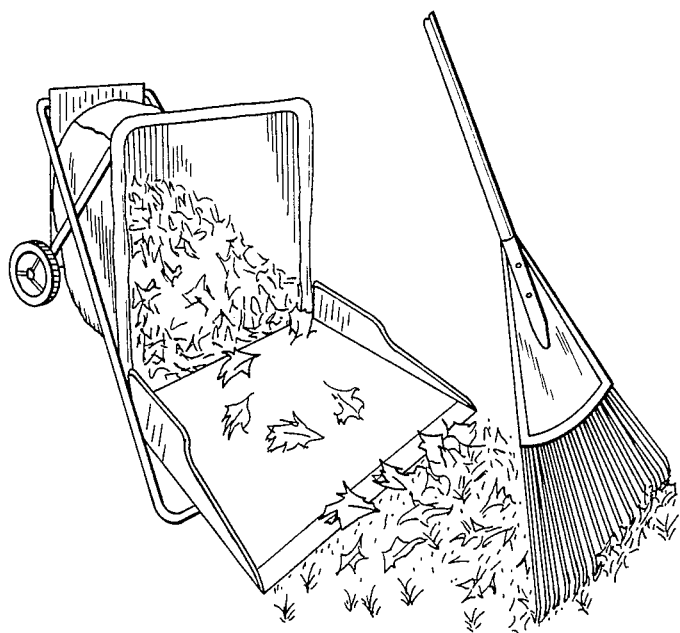

UTILITY STAND

FIELD OF THE INVENTION

This invention relates to utility stands. More particularly, this invention relates to portable utility stands for temporarily supporting a bag in an upright open position to receive the deposit of trash, leaves, grass clippings, or other material therein.

BACKGROUND OF THE INVENTION

When using conventional plastic trash or garbage bags for bagginq various materials and items such as trash, garbage, leaves, grass clippings, etc. the most common problem which one normally encounters involves trying to support the bag with the top in an open position so that the material can be inserted into the bag easily. When the bag is set on the ground for support the top does not remain open enough to allow very much material to be placed in the bag at a time. Also, if the top of the bag is not supported in some manner it will collapse and allow material to fall out of the bag again.

The insertion of material into a trash bag is difficult and inefficient because of the limited size of the bag open ing. Also, once the bag is filled, the plastic bag can tear or split relatively easily when it is transported.

Placing a plastic trash bag in a metal or plastic trash can before filling the bag does not cure the problems of supporting the bag. Once the bag is filled there is still the problem of removing the filled bag without tearing it. This problem is enhanced when the weight of the material which has been placed in the bag exceeds the capacity of the bag. As a result, the bag can quickly tear or split when an attempt is made to remove the bag from the trash can.

Various types of stands and carts have been developed by others to support a bag while it is being filled. See, for example, U.S. Pat. Nos. 156,506; 190 494; 247,220; 296,135; 725,721; 1,414,575; 2,455,729; 3,659,816; 3,771,752; 3,806,146; 3,815,933; 3,893,699; 3,992 034; 4,139,029; 4,202,521; 4,562,983; and 4,749,158. A collapsible frame is also described in UK Application No. 2,133,282.

Some of such prior devices were not intended for use with conventional plastic trash bags. Other of such devices are not suitable or effective for use with plastic trash or garbage bags. For example, some of such devices do not have sufficient integrity to withstand repeated use. Other devices do not adequately support a trash bag in an open position as it is being filled. Still other devices are not collapsible. Some are not readily portable.

None of the commercially-available devices utilize a chute for ease of access to the bag opening for placement of the waste material into the bag. Some of such devices are not intended for use with plastic trash bags at all.

There has not heretofore been provided a portable, collapsible, self-supporting utility stand having the features and advantages exhibited by the utility stand of the present invention.

SUMMARY OF THE PRESENT INVENTION

In accordance with the present invention there is provided a portable, self-supporting, collapsible utility stand which is adapted to support a conventional plastic trash bag or the like in an upright manner with its top open to receive the deposit of material (e.g., trash, garbage, leaves, grass clippings, etc.). In one embodiment the utility stand of the invention comprises:

(a) a first U-shaped frame member having upper and lower ends; wherein the upper end includes handle means;

(b) a second U-shaped frame member having upper and lower ends; wherein the second frame member is pivotably connected intermediate its ends to the first frame member;

(c) wheel members rotatably supported at the lower end of one of the frame members;

(d) bag holding and tensioning means carried by the first frame member; wherein the bag can be supported in an open upright position by the bag holding and tensioning means;

(e) flexible bag support means extending between the lower ends of the first and second frame members for supporting the closed end of the bag.

The frame members are pivotable with respect to each other between open and closed positions. When the frame members are pivoted to the closed position the utility stand is in a collapsed position and can be easily stored, such as when it is not being used. For example, it may be suspended from an appropriate hook or hanger on a wall.

When the frame members are pivoted to the open position the stand is able to support a trash bag or the like in an upright open condition. The top of the bag is simply folded back over the top of the bag holding and tensioning means and the upper end of one of the frame members. The base or lower portion of the bag rests upon the flexible bag support means extending between the lower ends of the two frame members.

The frame members can be urged apart and locked in their open position in a manner such that the trash bag is tensioned and the top of the bag is stretched tight. In this position the frame is rigid and very stable.

In a preferred embodiment the utility stand also includes a cover member which can be pivoted between open and closed positions. When in the closed or downward position the cover member rests over the top of the bag to serve as a cover. When the cover member is in its open or upward position it leans slightly rearwardly away from the bag. The cover member in such position acts as a chute or deflector to assist in directing trash and other such material into the open end of the bag. The cover member also operates as a large dust pan when the stand is laid on its side. This facilitates the sweeping or raking of trash, debris, leaves, etc. into the trash bag.

Because the utility stand has wheels at the lower end of one of the frame members, it can be easily wheeled to any desired location (with the bag in place or without a bag in place). After a bag has been filled it can be easily removed from the stand.

The utility stand is stable, even on sloping or irregular surfaces Preferably the wheels are positioned at the rear of the stand which provides more stability to the stand when material is thrown against the cover member as it is being deposited in the bag.

Other advantages and features of the utility stand of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 5 shows the utility stand in a collapsed position; and .

FIG. 6 shows another manner in which the utility stand may be used.

DETAILED DESCRIPTION OF THE INVENTION

Figure 1:
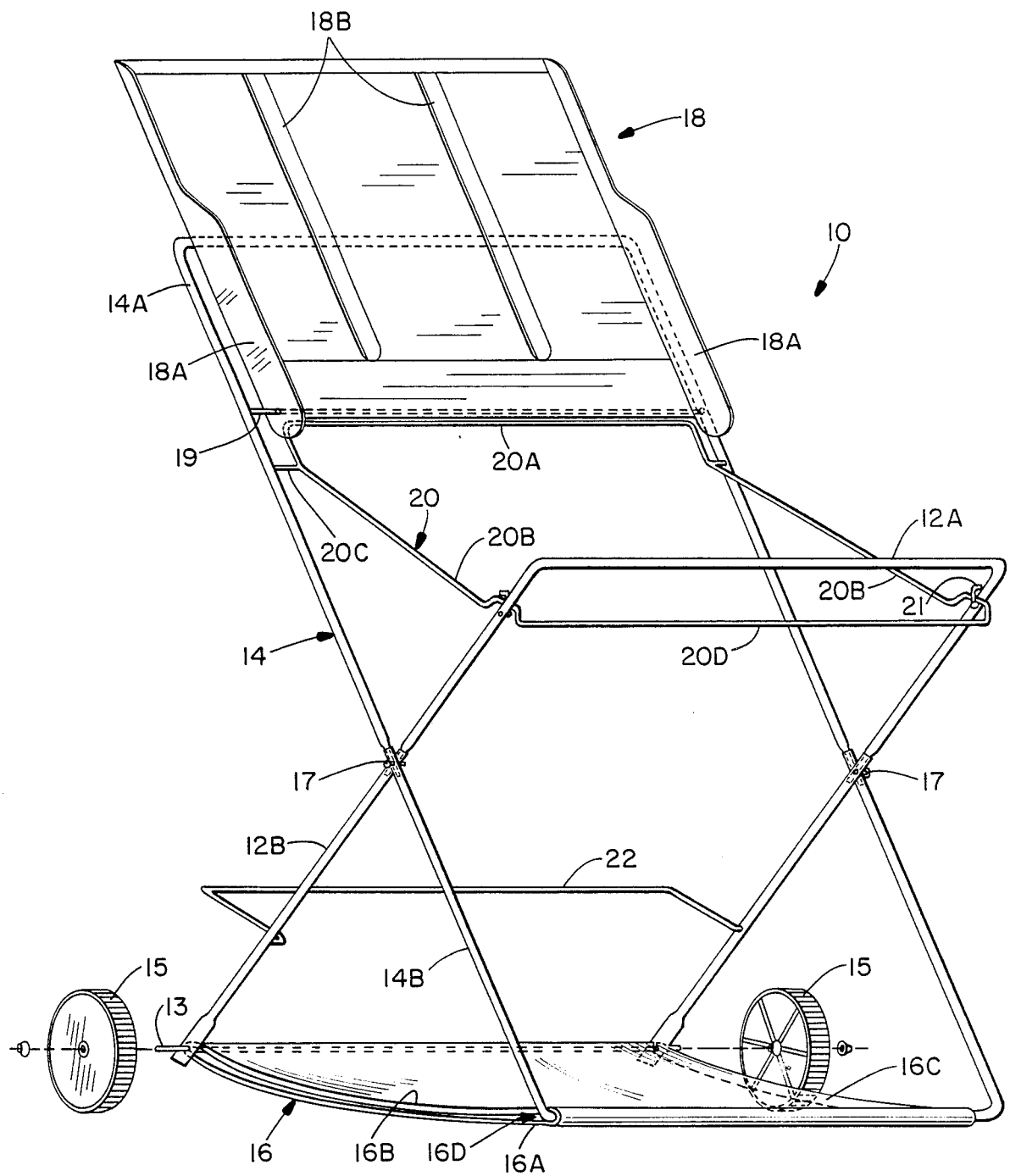
FIG. 1 is a perspective view of a preferred embodiment of portable utility stand of the invention.

Thus, in FIG. 1 there is shown a preferred embodiment of portable utility stand 10 of this invention. The stand includes U-shaped frame members 12 and 14 which are pivotably connected to each other intermediate their ends, as illustrated, so that they can be pivoted with respect to each other between an open position (which is illustrated in FIG. 1) and a closed position (which is illustrated in FIG. 5). This would be the collapsed position in which the stand may be stored when not in use.

Preferably the frame members are comprised of two sections (i.e., upper and lower sections) which are detachably secured together. For example, frame member 12 includes upper frame section 12A and lower frame section 12B. Frame member 14 includes upper frame section 14A and lower frame section 14B. The upper and lower frame sections are slidably interconnected. As illustrated in FIG. 1, the upper and lower sections of each frame member are secured together by means of bolts 17 which pass through registering openings in the upper and lower frame sections of both frame members. The bolts 17 also form the pivot points for the two frame members 12 and 14 so that the frame members may pivot with respect to each other.

As illustrated, one of the frame members may be longer than the other so that the upper end of the longer frame member can serve as a handle for the stand. In FIG. 1 the longer frame member is 14 and the upper end thereof is a handle for the utility stand.

The lower end of frame member 12 accommodates a transverse axle member 13 on which there are rotatably mounted two wheels 15. The wheels may be made of plastic or any other suitable material. The wheels are only located on the lower end of one of the frame members. The two frame members are also illustrated in the front elevational views of FIGS. 3 and 4.

Connected between the lower ends of the two frame members 12 and 14 is a flexible bag support means 16. In a preferred sense the support means 16 comprises an endless belt (as illustrated) which includes two parallel horizontal sections or portions 16A and 16B which are secured together along one edge. For example, the two sections 16A and 16B may be composed of plastic sheet material (e.g., about 0.010 inch thick) and are heat-sealed together along edge 16C. This arrangement leaves a pocket or cavity 16D between sections 16A and 16B for storage of fresh trash bags, for example. The sheet material is flexible, durable, and crack resistant.

The bag support 16 supports the bottom of the trash bag. Because it is flexible, the bag support will fold and collapse against itself when the frame members are pivoted to their closed position. In the open position of the stand the bag support 16 prevents the lower ends of the frame members from expanding or collapsing in an outward direction.

Preferably there is a cover member 18 pivotably attached at its lower end to the upper section of frame member 14, as illustrated. For example, cover member 18 may include a transverse aperture at its lower end which accommodates a shaft 19 on which the cover member is mounted to the frame. The ends of the shaft 19 are connected to opposite sides of the frame member 14.

The cover member 18 may be pivoted between an open position (illustrated in FIG. 1, and a closed position in which it is a horizontal position over the open end of a trash bag supported in the stand 10. Preferably there are flanges on wings 18A on opposite side edges of the cover member. These flanges assist in directing trash or other such material into the open end of a trash bag supported in the stand.

The cover member 18 is preferably made of durable and impact-resistant plastic or other such suitable material. If desired, the cover member may include reinforcing ribs 18B.

When the cover member 18 is in its open position (shown in FIG. 1) it leans slightly rearwardly and rests against the upper end of frame member 14. This enables the cover member to act as a chute or deflector for material to be deposited into the open end of the trash bag.

Bag holding and tensioning means 20 includes an elongated bar member 20A which extends horizontally between the opposing sides of the frame member 14. One side of the open end of a trash bag is placed over bar 20A (the other side of the bag opening is placed over the upper end of frame 12). Two parallel arm members 20B extend between the upper ends of the two frame members 12 and 14, as illustrated. Frame member 12 includes catch means 21 which are adapted to detachably secure arm members 20B thereto, as illustrated in FIG. 1.

The opposite ends of arm members 20B are pivotally carried by the upper end of frame member 14 (e.g., by means of shafts 20C). Thus, arm members 20B will engage the catch means 21 when the upper frame sections are urged away from each other. This mechanism serves to tension or stretch the open end of the plastic trash bag supported in the stand. In other words, the length of the arms 20B is such that the upper ends of the frame members must be urged apart to enable the arms to be locked in place by the catch means 21. After the top or upper end of the bag is draped over bar 20A and the top of frame 12, the arms 20B are locked in place to hold the upper ends of frame members 12 and 14 apart.

Figure 3:
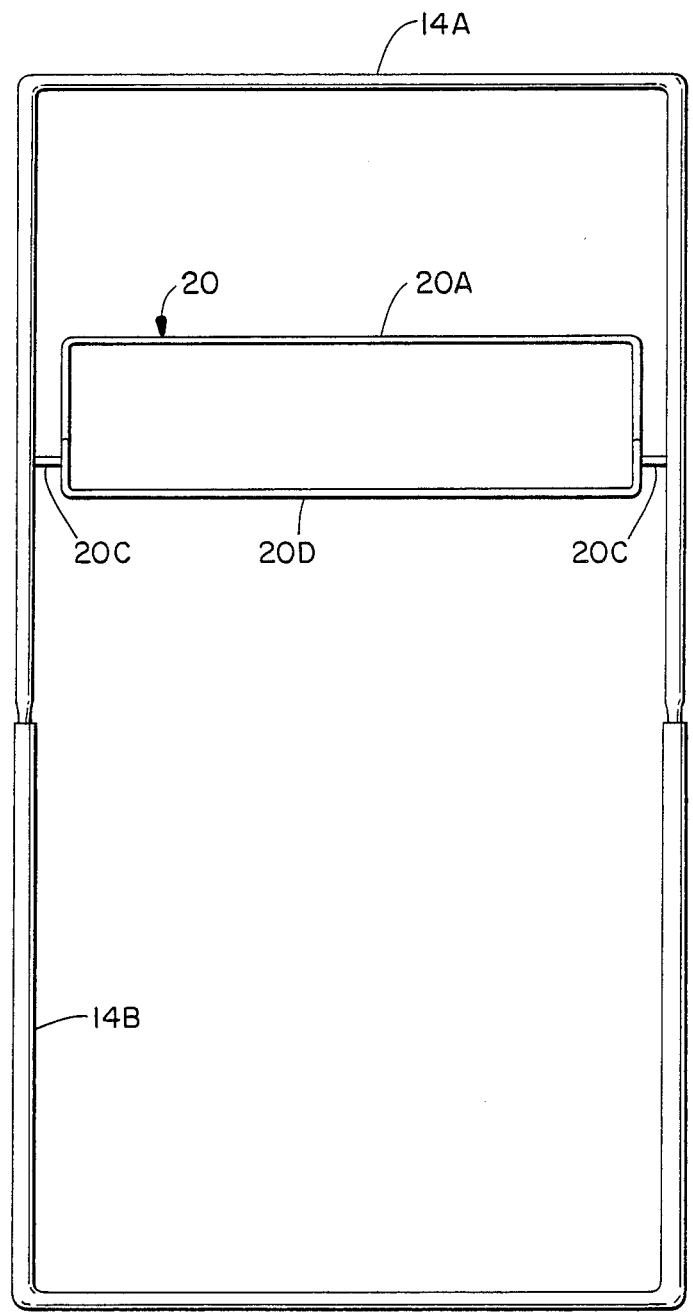
FIG. 3 is a front elevational view of one of the frame members used in the present invention.
Figure 4:
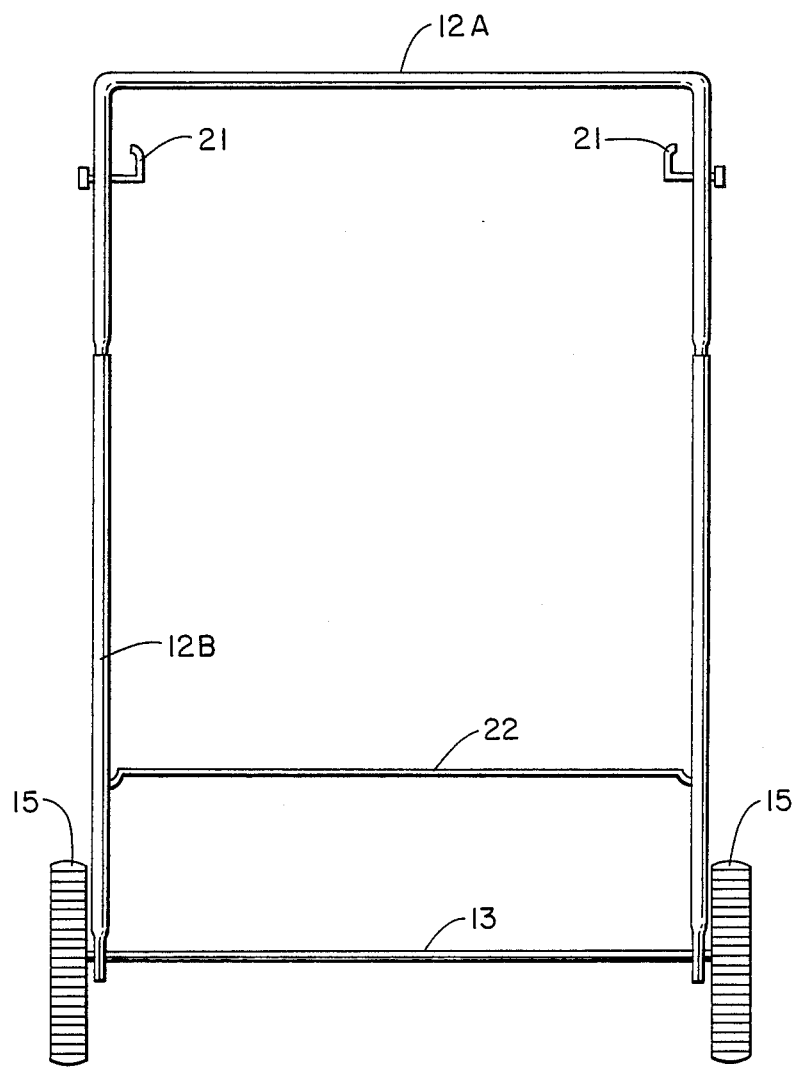
FIG. 4 is a front elevational view of another of the frame members used in the present invention.

The catch means 21 may comprise a finger at each side of frame 12, as illustrated. Preferably the outer end of each arm 20B includes a bend which facilitates engagement of the finger as shown. Of course, if desired, the outer ends of arms 20B may be connected together by means of transverse bar 20D. This is also illustrated in FIG. 3.

The bag holding and tensioning means 20 also imparts desirable rigidity and strength to the utility stand in its open position. Thus, the utility stand does not wobble or sway when trash and other material is placed into the bag supported in the stand.

If desired, there may be also included a bar 22 which extends across the rear of the stand between the leg portions of frame member 12. Bar 22 assists in preventing the lower end of a trash bag from sliding off the base 16 when the stand is tilted rearwardly (e.g., for purposes of wheeling the utility stand from one location to another).

The frame members used in the utility stand are preferably composed of steel tubing (e.g., 0.75 inch diameter), aluminum tubing, or bar material which is sufficiently strong to support the weight of a filled trash bag. The size of the utility stand may also vary. Preferably the utility stand can accommodate the conventional 33 gallon and 39 gallon plastic trash bags (which have the same circumference). Of course, the utility stand could be made to accommodate any desired size of bag.

Figure 2:
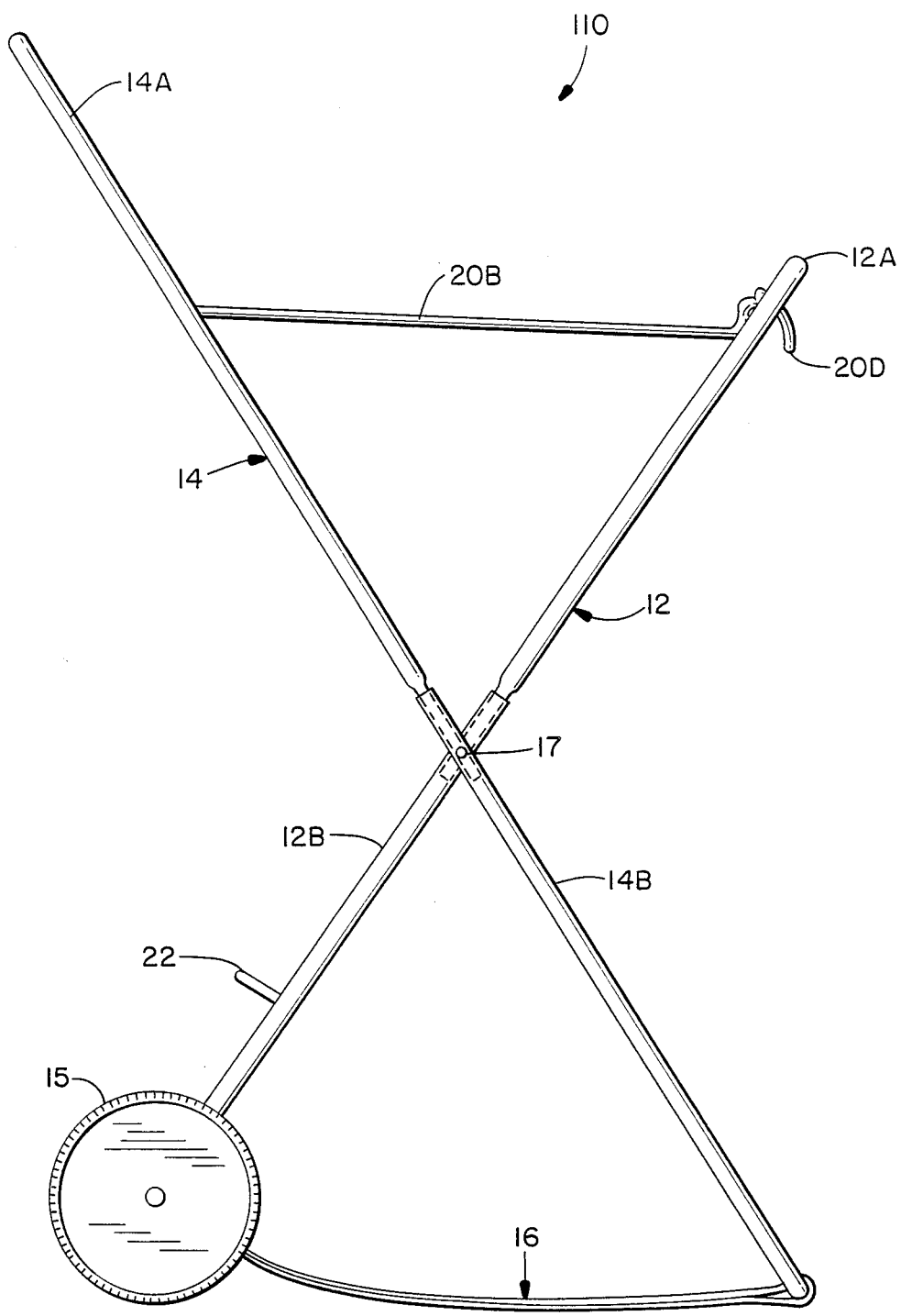
FIG. 2 is a side elevational view of another embodiment of portable utility stand of the invention.

The utility stand of the invention may also be made without a cover member. For example, in FIG. 2 the stand 110 is illustrated in a side elevational view with no cover member included. The frame member 14 is longer than frame member 12 so that the upper end or top portion of frame member 14 may serve as a handle for the stand. Of course, a separate handle member could be attached to frame member 14, if desired.

When the utility stand is not in use it may be easily collapsed for storage. This is accomplished by disengaging the outer ends of arms 20B from the catch means 21 and then urging the frame members 12 and 14 towards each other to a closed position. This is illustrated in FIG. 5. After the stand has been collapsed in this manner it may be suspended from an appropriate hook or hanger, for example, on a wall of a garage, storage shed, etc.

When the cover member 18 is included in the stand it can also serve as a large "dust pan" to facilitate sweeping or raking of debris, trash, leaves, etc. directly into the bag. This is accomplished by tipping the stand rearwardly and laying it on the ground, as illustrated in FIG. 6.

Other variants are possible without departing from the scope of this invention.

What is claimed is:

1. A portable, self-supporting, collapsible utility stand for supporting a trash bag or the like in an upright open position for the deposit of material into said bag; wherein said bag includes an open end and a closed end; said utility stand comprising:
   (a) a first U-shaped frame member having upper and lower ends; wherein said upper end includes handle means;
   (b) a second U-shaped frame member having upper and lower ends; wherein said second frame member is pivotably connected intermediate its said ends to said first frame member;
   (c) wheel members rotatably supported at said lower end of one of said frame members;
   (d) bag holding and tensioning means carried by said frame members; wherein said bag can be supported in an upright open position by said bag holding and tensioning means; wherein said holding an tensioning means comprises at least one arm extending between said first and second frame members to hold the upper ends of said frame members apart;
   (e) flexible bag support means extending between said lower ends of said first and second frame members for supporting the closed end of said bag;
   wherein said frame members are pivotable with respect to each other between open and closed positions.

2. A utility stand in accordance with claim 1, wherein said first frame member is longer than said second frame member; wherein said bag holding and tensioning means further comprises (a) an elongated bar extending horizontally across said first frame member below said upper end of said first frame member between said first and second frame members and is adapted to hold said upper ends of said frame members apart from each other.

3. A utility stand in accordance with claim 2, wherein said bar is disposed within the plane of said first frame member and includes a straight portion which has a length less than the width of said first frame member.

4. A utility stand in accordance with claim 1, wherein said bag support means comprises a flexible plastic sheet.

5. A utility stand in accordance with claim 1, wherein said bag support means comprises an endless belt having a width approximately equal to the width of said frame members.

6. A utility stand in accordance with claim 5, wherein said belt includes upper and lower horizontal portions and first and second side edges; wherein said upper and lower portions are secured to each other along said first side edge in a manner such that a pocket is formed between said upper and lower horizontal portions.

7. A utility stand in accordance with claim 2, further comprising a cover member including front and rear portions and opposite side edges; wherein said rear portion is pivotally attached to said first frame member in a manner such that said cover is pivotable between an upward position and a downward position.

8. A utility stand in accordance with claim 7, wherein said opposite side edges of said cover include flanges which project downwardly when said cover is in said downward position; wherein said cover slopes rearwardly toward said first frame member when in said upward position so as to guide said material into said bag.

9. A utility stand in accordance with claim 2, wherein said bag holding and tensioning means includes two parallel arm members having first and second ends; wherein said first ends are pivotally attached to said first frame member; and wherein said second ends are adapted to be detachably secured to said second frame member for locking said frame members in said open position.

10. A utility stand in accordance with claim 7, wherein said front portion of said cover includes a tapered front edge.

11. A portable, self-supporting, collapsible utility stand for supporting a trash bag or the like in an upright open position for the deposit of material into said bag; wherein said bag includes an open end and a closed end, said utility stand comprising:
   (a) a first U-shaped frame member having upper and lower ends; wherein said upper end includes handle means;
   (b) a second U-shaped frame member having upper and lower ends; wherein said second frame member is pivotably connected intermediate its said ends to said first frame member;

(c) wheel members rotatably supported at said lower end of said second frame member;

(d) bag holding and tensioning means comprising (i) an elongated bar extending horizontally across said first frame member below said upper end thereof; and (ii) two parallel arm members having first and second ends; wherein said first ends are pivotally attached to said first frame member; and wherein said second ends are adapted to be detachably secured to said second frame member;

(e) flexible bag support means extending between said lower ends of said first and second frame members for supporting the closed end of said bag;

(f) a cover member including front and rear portions and opposite side edges; wherein said rear portion is pivotally attached to said first frame member in a manner such that said cover is pivotable between an upward position and a downward position;

wherein said first frame member is longer than said second frame member; wherein said frame members are pivotable with respect to each other between open and closed positions; and wherein said bag can be supported in an open position by said bag holding and tensioning means and said second frame member.

12. A utility stand in accordance with claim 11, wherein said bar is disposed within the plane of said first frame member and includes a straight portion which has a length less than the width of said first frame member.

13. A utility stand in accordance with claim 11, wherein said opposite side edges of said cover include flanges which project downwardly when said cover is in said downward position; wherein said cover slopes rearwardly toward said first frame member when in said upward position so as to guide said material into said bag.

14. A utility stand in accordance with claim 11, wherein said bag support means comprises an endless belt having a width approximately equal to the width of said frame members.

15. A utility stand in accordance with claim 14, wherein said belt includes upper and lower horizontal portions and first and second side edges; wherein said upper and lower portions are secured to each other along said first side edge in a manner such that a pocket is formed between said upper and lower horizontal portions.

16. A utility stand in accordance with claim 11, wherein said upper end of said second frame member further includes catch means for detachably securing said second ends of said arm members to said second frame member for locking said frame members in said open position.

17. A utility stand in accordance with claim 11, wherein said front portion of said cover includes a tapered front edge.

18. A portable, self-supporting, collapsible utility stand for supporting a trash bag or the like in an upright open position for the deposit of material into said bag; wherein said bag includes an open end and a closed end, said utility stand comprising:

(a) a first U-shaped frame member having upper and lower ends; wherein said upper end includes handle means;

(b) a second U-shaped frame member having upper and lower ends; wherein said second frame member is pivotably connected intermediate its said ends to said first frame member; said upper end of said second frame member further including catch means;

(c) wheel members rotatably supported at said lower end of said second frame member;

(d) bag holding and tensioning means comprising (i) an elongated bar extending horizontally across said first frame member below said upper end thereof; and (ii) two parallel arm members having first and second ends; wherein said first ends are pivotally attached to said first frame member; and wherein said second ends are adapted to be detachably secured to said second frame member;

(e) flexible bag support means extending between said lower ends of said first and second frame members for supporting the closed end of said bag; said bag support means including upper and lower horizontal portions and first and second side edges; wherein said upper and lower portions are secured to each other along said first side edge in a manner such that a pocket is formed between said upper and lower portions;

(f) a cover member including front and rear portions and opposite side edges; wherein said rear portion is pivotally attached to said first frame member in a manner such that said cover is pivotable between an upward position and a downward position;

wherein said first frame member is longer than said second frame member; wherein said frame members are pivotable with respect to each other between open and closed positions; wherein said second ends of said arm members are adapted to be detachably secured to said second frame member by said catch means, and wherein said frame members can be locked in said open position.

* * * * *